United States Patent
Pinter et al.

(10) Patent No.: US 8,896,897 B2
(45) Date of Patent: Nov. 25, 2014

(54) MICROMECHANICAL COMPONENT AND A METHOD FOR OPERATING A MICROMECHANICAL COMPONENT

(75) Inventors: Stefan Pinter, Reutlingen (DE); Joerg Muchow, Reutlingen (DE); Joachim Fritz, Tuebingen (DE); Christoph Friese, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 639 days.

(21) Appl. No.: 12/998,538

(22) PCT Filed: Sep. 16, 2009

(86) PCT No.: PCT/EP2009/062017
§ 371 (c)(1),
(2), (4) Date: Jul. 15, 2011

(87) PCT Pub. No.: WO2010/060664
PCT Pub. Date: Jun. 3, 2010

(65) Prior Publication Data
US 2011/0261428 A1    Oct. 27, 2011

(30) Foreign Application Priority Data
Nov. 3, 2008 (DE) .......................... 10 2008 043 416

(51) Int. Cl.
*G02B 26/08* (2006.01)
*G02B 27/01* (2006.01)

(52) U.S. Cl.
CPC ............ *G02B 26/0833* (2013.01); *G02B 27/01* (2013.01); *Y10S 359/90* (2013.01)
USPC ...................... 359/213.1; 359/199.1; 359/900; 250/236

(58) Field of Classification Search
USPC ...................... 359/196.1–226.2; 250/234–236
See application file for complete search history.

(56) References Cited

U.S. PATENT DOCUMENTS

| | | | | |
|---|---|---|---|---|
| 4,800,270 A | * | 1/1989 | Blais | 250/235 |
| 5,187,364 A | * | 2/1993 | Blais | 250/236 |
| 6,175,451 B1 | | 1/2001 | Iriyama et al. | |
| 2002/0075553 A1 | | 6/2002 | Orcutt | |
| 2011/0058109 A1 | * | 3/2011 | Nishigaki et al. | 348/744 |

FOREIGN PATENT DOCUMENTS

WO   WO 00/67065   11/2000

* cited by examiner

*Primary Examiner* — James Phan
(74) *Attorney, Agent, or Firm* — Kenyon & Kenyon LLP

(57) ABSTRACT

A micromechanical component has a light window; a mirror element adjustable with respect to the light window from a first position into at least one second position about at least one axis of rotation, an optical sensor having a detection surface designed to ascertain a light intensity on the detection surface and to provide a corresponding sensor signal. The light window, the mirror element in the first position and the detection surface are situated in relation to one another in such a way that a portion of a light beam reflected on the light window strikes the detection surface at least partially; and an evaluation unit designed to define, on the basis of the sensor signal, information regarding an instantaneous position of the mirror element and/or an instantaneous intensity of the deflected light beam.

8 Claims, 3 Drawing Sheets

MICROMECHANICAL COMPONENT AND A METHOD FOR OPERATING A MICROMECHANICAL COMPONENT

BACKGROUND OF THE INVENTION

1. Field of the Invention

The present invention relates to a micromechanical component and a method for operating such a micromechanical component.

2. Description of Related Art

A micromechanical component for an optical beam deflection often has a mirror adjustable about at least one axis of rotation. For example, the mirror may be gimballed opposite an immovable frame, so that the mirror is adjustable about two axes of rotation oriented perpendicularly to one another. A micromechanical component having a mirror adjustable about two axes of rotation is used, for example, for scanning a surface with a light beam in a projector or in a scanner. It is advantageous here if information about an instantaneous position of the mirror with respect to the frame about the two axes of rotation is ascertainable during operation of the projector or the scanner. This makes it possible to verify whether the instantaneous position of the mirror corresponds to a desired mirror position.

A first possibility known from the related art for ascertaining an instantaneous position of the mirror with respect to the frame is based on a placement of piezoresistive elements on the torsion springs by which the mirror is connected to the frame. The piezoresistive elements may be designed as Wheatstone bridges, for example. When the torsion springs are rotated, mechanical stresses occur, causing a change in the electrical resistances of the piezoresistive elements. The instantaneous position of the mirror with respect to the frame is settable by analyzing the electrical resistances of the piezoresistive elements.

However, to ascertain the electrical resistances of the piezoresistive elements, electrical feeder lines connecting the piezoresistive elements to an evaluation unit are guided over the torsion springs (or on the gimbal ring). A piezoresistive element designed as a Wheatstone bridge requires four such electrical feeder lines, for example. The electrical feeder lines must be designed to be relatively narrow for them to be able to be guided over the torsion springs. As a power supply, relatively high currents must be fed to the piezoresistive elements. However, the useful electrical signals generated on the piezoresistive elements are very weak and susceptible to interference.

The manufacture, placement and shielding of the electrical feeder lines are therefore comparatively difficult. In addition, the electrical feeder lines are often subject to mechanical destruction due to the spring deformation. Furthermore, the electrical feeder lines affect the flexural rigidity and torsional rigidity of the torsion springs, which has a negative effect on the adjustability of the mirror.

In a second option which is known from the related art for ascertaining an instantaneous position of the mirror with respect to the frame, at least one first electrode is fixedly situated on a movable element, for example, the mirror or a torsion spring. Depending on an adjusting movement of the movable element, a capacitance between the first electrode and a second electrode situated fixedly with respect to the frame changes. The signal used for the analysis with respect to the capacitance between the two electrodes is, however, comparatively low and is susceptible to interference accordingly. The position of the mirror determined on the basis of the signal is thus often inaccurate. Furthermore, this traditional option for ascertaining the instantaneous position of the mirror also requires an electrical feeder line guided over a torsion spring for contacting the first electrode. The disadvantages described in the paragraph above therefore also occur when ascertaining the instantaneous position of the mirror by analyzing the capacitance between the two electrodes.

BRIEF SUMMARY OF THE INVENTION

The present invention is based on the finding that a micromechanical component having a mirror element usually has a light window at whose interfaces the emerging light beam is partially reflected and deflected as a reflected beam into the interior of the micromechanical component. The incident position of the reflected beam on an inside surface of the micromechanical component, which may be referred to as the reflection position, depends on an instantaneous position of the reflecting mirror element with respect to the light window. By ascertaining the reflection position, there is thus the possibility of ascertaining information about the instantaneous position of the reflecting mirror element with respect to the light window. Additionally or alternatively, the instantaneous intensity of the light beam may also be determined in this way.

The reflection position is usually not on the mirror element or the at least one spring for adjusting the mirror element in at least one position of the mirror element. Therefore, at least one optical sensor may be situated in such a way that it does not affect the adjustment properties of the reflecting mirror element or the flexural rigidity and torsional rigidity of the springs. The present invention thus offers a more advantageous option for ascertaining the instantaneous position of the reflecting mirror element and/or the instantaneous intensity of the light beam in comparison with the related art.

Information about an instantaneous position of the mirror element with respect to the light window may be understood to be a variable which is in a relationship to the position of the mirror element with respect to the light window. This information may of course also include a position and/or an angle of alignment of the mirror element with respect to another component of the micromechanical component situated fixedly with respect to the light window.

The information defined with respect to the instantaneous position of the mirror element may be compared with a set-point position of the mirror element by a comparator device designed for a self-test function for this purpose. The components used for the self-test function are easily integratable into the micromechanical component. The optical sensor is an optoelectronic element, for example. The at least one optical sensor in particular may be situated in such a way that no electrical feeder lines over the at least one spring by which the mirror element is connected to a frame holder are needed. There is therefore no risk of electrical interference of the useful signal due to an electrical feeder line situated on the at least one spring.

In an advantageous specific embodiment, the micromechanical component includes a control and drive unit designed to adjust the mirror element about two axes of rotation for scanning an area with the aid of a portion of the deflected light beam transmitted through the light window, the control and drive unit being additionally designed to adjust the mirror element upon reception of a light beam blocking signal in such a way that the deflected light beam is directed onto an aperture of the micromechanical component. The micromechanical component according to the present invention may be used in a projector or a scanner, for example. The micromechanical component is used, for example, as a micromirror for a head-up display in a motor vehicle, in an image projector and/or in a 2D scanner. By directing the deflected light beam onto the aperture, a "black spot" in a projected image may be created without having to reduce the intensity of the deflected light beam. In addition, the information with respect to the instantaneous position of the mirror element with respect to the light window and/or with respect to the instantaneous intensity of the deflected light beam is ascertainable on the basis of the reflected beam which is reflected on the aperture.

In an advantageous refinement, the evaluation unit is additionally designed to recognize a shutdown of the mirror element on the basis of a curve of the sensor signal over time, and, if a shutdown of the mirror element is recognized for a predefined period of time, to output the light beam blocking signal to the control and drive unit. As an alternative, a shutdown signal may also be output to a light source emitting the deflected light beam. It is possible in this way to significantly reduce the risk of injury, which is particularly high when the deflected light beam strikes a person's eye for a rather long period of time.

The advantages described in the paragraphs above are also ensured with a corresponding method for operating a micromechanical component having a light window and a mirror element.

A predefined image may be projected onto a projection surface in particular, by adjusting the mirror element about two axis of rotation in such a way that the projection surface is scanned at least partially by a portion of the deflected light beam transmitted through the light window, the instantaneous position of the mirror element being ascertained at least once during the scanning of the projection surface and is compared with the predefined setpoint position of the mirror element. The present invention thus enables a self-test function and function monitoring during operation of the micromechanical component.

In addition, at least two light sources may be activated one after the other, and after activation of one of the at least two light sources, the instantaneous intensity of the deflected light beam is ascertained, and by taking into account the ascertained instantaneous intensity, a brightness control signal is output to the light source activated last. A calibration of the brightness of the at least two light sources may be performed easily in this way.

In addition, the projection surface may be scanned at least partially by adjusting the mirror element about at least one of the two axes of rotation, so that during the at least partial scanning of the projection surface, it is ensured that a light beam emitted by the at least one emitting light source does not strike the detection surface, so that at least a partial light intensity on the projection surface is defined by ascertaining the light intensity on the detection surface. For example, the at least one emitting light source is deactivated before that or the emission of the at least one emitting light source is blocked. It is thus possible to measure a light intensity on the projection surface by the method described here or by a corresponding micromechanical component.

DETAILED DESCRIPTION OF THE INVENTION

Figure 1A:
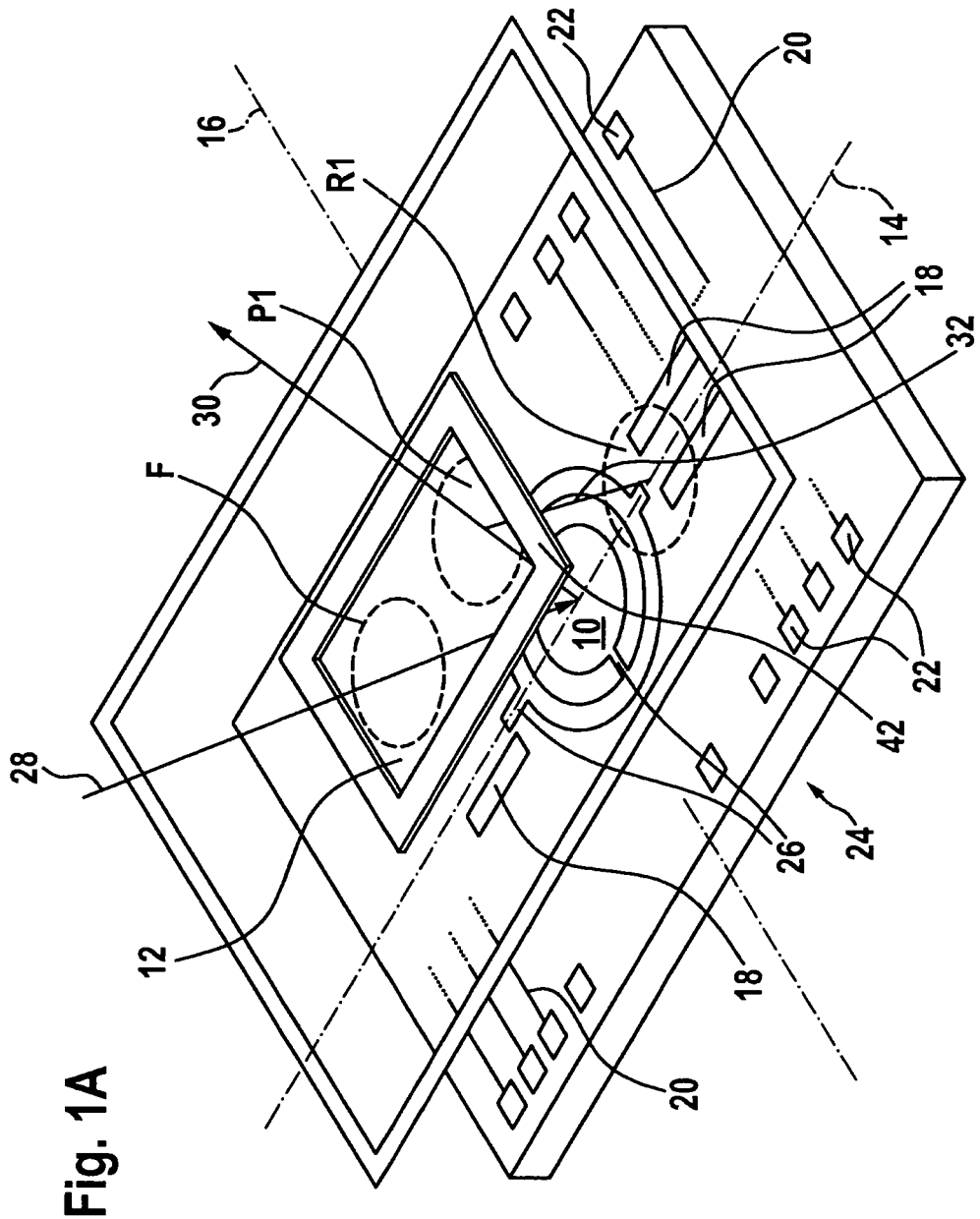
FIGS. 1A and 1B show schematic diagrams of one example embodiment of the micromechanical component.
Figure 1B:
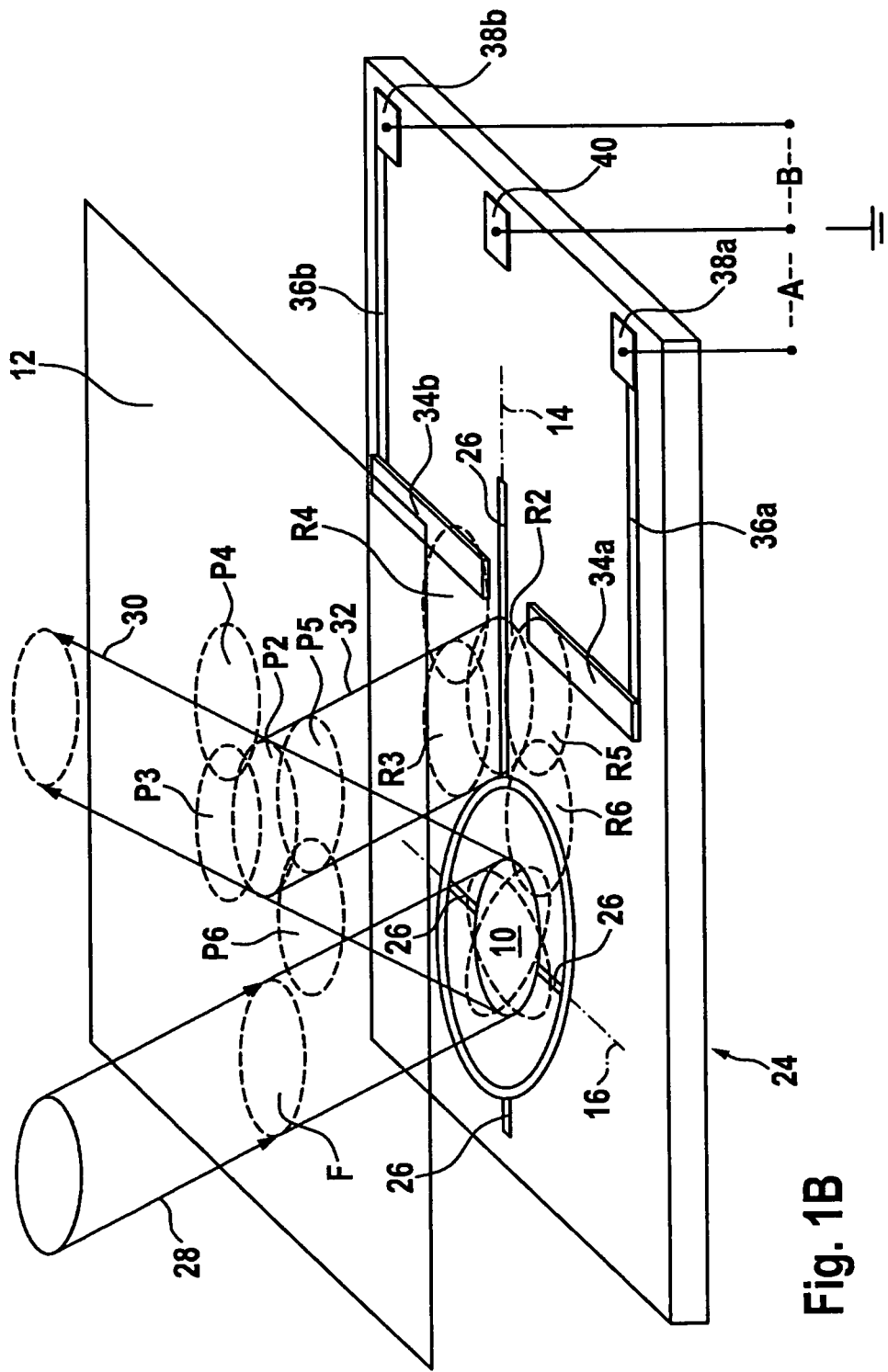

FIGS. 1A and 1B show schematic diagrams of one example embodiment of the micromechanical component.

The micromechanical component presented here has a mirror element 10, which is adjustable with respect to a light window 12 of a housing of the micromechanical component. In the specific embodiment presented here, mirror element 10 is adjustable with respect to light window 12 about a first axis of rotation 14 and about a second axis of rotation 16. The adjustment of mirror element 10 about at least one of two axes of rotation 14 and 16 may be accomplished via an electrostatic drive and/or a magnetic drive, for example. Both axes of rotation 14 and 16 are preferably aligned perpendicularly to one another.

However, the present invention is not limited to a mirror element 10 adjustable about two axes of rotation 14 and 16. Mirror element 10 may instead be situated adjustably about only one axis of rotation 14 or 16. The present invention is likewise not limited to one specific type of drive for adjusting mirror element 10. Components 18 through 22 of the drive for adjusting mirror element 10 about at least one of axes of rotation 14 and 16 shown only in FIG. 1A will not be detailed further for this reason.

Mirror element 10 may be etched out of a chip 24, for example. In this case, at least one spring 26 may additionally be etched out of chip 24 during manufacture of mirror element 10, with the aid of which mirror element 10 is connected to chip 24 functioning as a frame holder. For example, mirror element 10 is gimballed on chip 24 with the aid of four springs 26 designed as torsion springs, as diagramed schematically in FIG. 1B. Two springs 26 run along two axes of rotation 14 and 16, about which mirror element 10 is adjustable. No further details will be given here since suitable springs 26 for suspending an adjustable mirror element 10 on a chip 24 are known from the related art.

For the sake of better clarity, only light window 12 of the various components of the housing of the micromechanical component is shown in FIGS. 1A and 1B. An incident light beam 28 may be coupled into the interior of the housing of the micromechanical component through light incidence window 12 in such a way that incident light beam 28 strikes mirror element 10. Light window 12 is preferably manufactured from a material such as glass having a high transmittance. In the example shown in FIGS. 1A and 1B, an incident light beam 28 is transmitted through a coupling surface F on an external interface of light window 12. However, it is pointed out that the present invention is not limited to a micromechanical component in which incident light beam 28 is emitted by a light source outside of the micromechanical component. Instead, a light source for emission of incident light beam 28 may be situated in the interior of the micromechanical component.

Incident light beam 28 is deflected on the surface of mirror element 10, which is designed to be reflecting, in such a way that it strikes light window 12 as a deflected light beam 30. Mirror element 10 therefore preferably has a surface having a high reflectivity, for example, due to a suitable coating. The angle of incidence of deflected light beam 30 striking light window 12 depends on an instantaneous position of mirror element 10 with respect to light window 12. Accordingly, the angle of incidence changes or an incident position P1 through P6 of deflected light beam 30 on light window 12 changes with rotation of mirror element 10 about at least one of the axes of rotation 14 and 16. (Incident positions P1 through P6 shown here are merely examples of possible incident positions.)

Deflected light beam 30 striking light window 12 is at least partially reflected on at least one of the interfaces of light window 12. The reflected portion of deflected light beam 30 falls back into the interior of the micromechanical component as reflected beam 32. The unreflected portion of deflected light beam 30 is transmitted through light window 12 and may be used for scanning a line or an area.

In the example of FIGS. 1A and B, light window 12 is situated with respect to chip 24, in such a way that reflected beam 32 strikes a reflection position R1 through R6 on a surface of chip 24. (Merely possible examples of reflection positions R1 through R6 are shown according to incident positions P1 through P6.) Light window 12 may of course also be situated with respect to mirror element 10 in such a way that reflected beam 32 strikes another desired surface region in the interior of the micromechanical component.

Reflection position R1 through R6 on chip 24 depends on incident position P1 through P6 of deflected beam 30 on the light incident window. To better illustrate this dependence, various incident positions P2 through P6 with their respective reflection positions R2 through R6 on chip 24 are shown in FIG. 1B.

There is thus a relationship between an instantaneous position of mirror element 10 with respect to light window 12 and with respect to chip 24 and reflection position R1 through R6 of reflected beam 32 on chip 24. We also speak here of reflection position R1 through R6 of reflected beam 32 on chip 24 depending on a deflection of mirror element 10 out of its starting position. If mirror element 10 is in its starting position, in which mirror element 10 is aligned parallel to the surface of chip 24, then reflected beam 32 strikes reflection position R2 on the surface of chip 24. However, reflection positions R3 through R6 correspond to maximum deflections of mirror element 10 about one of the two axes of rotation 14 and 16 in different directions of rotation.

By positioning at least one optical sensor 34a or 34b on chip 24, information about an instantaneous position of reflection position R1 through R6 of reflected beam 32 may be ascertained. The at least one optical sensor 34a or 34b is preferably designed as a light-sensitive electrical element whose sensor signal depends on the light intensity striking the detection surface of optical sensor 34a or 34b. It is also possible to use an electro-optical element whose signal depends on the position of the incident light beam (PSD, position sensitive device). The detection surface is, for example, the surface of optical sensor 34a or 34b. A simple embodiment of the at least one optical sensor 34a or 34b which is inexpensive to manufacture is a diode having a pn junction, which is manufacturable using standard manufacturing methods on chip 24.

The at least one optical sensor 34a or 34b is preferably situated at a distance from mirror element 10 and the at least one spring 26. For example, the at least one optical sensor 34a or 34b is situated on a fixed land area of chip 24, so that the at least one optical sensor 34a or 34b is electrically simple to contact without necessitating an electrical line 36a or 36b guided over the at least one spring 26 for contacting optical sensor 34a or 34b. In this case, mounting the at least one optical sensor 34a or 34b does not affect the flexural or torsional rigidity of the at least one spring 26 and the adjustability of mirror element 10.

Instantaneous reflection position R1 through R6 of reflected beam 32 may be ascertained with high precision by a suitable number, geometric shape and positioning of a plurality of optical sensors 34a and 34b on the surface of chip 24. Since possible specific embodiments of the geometry, placement and electrical wiring of a plurality of optical sensors 34a and 34b are self-evident to those skilled in the art, the placement of the two optical sensors 34a and 34b is indicated only schematically in FIG. 1B. Each of the two optical sensors 34a and 34b is connected to a corresponding contact 38a or 38b via at least one electrical line 36a or 36b. In addition, a ground 40 is embodied on the surface of chip 24.

Voltage signal A is picked up between contact 38a and ground 40. Accordingly, voltage signal B is picked up between contact 38b and ground 40. The level of a voltage signal A or B corresponds to the intensity of the light striking the detection surface of associated optical sensor 34a or 34b. Reflection position R1 through R6 of reflected beam 32 on the surface of chip 24 may thus be ascertained on the basis of voltage signals A and B.

Figure 2:
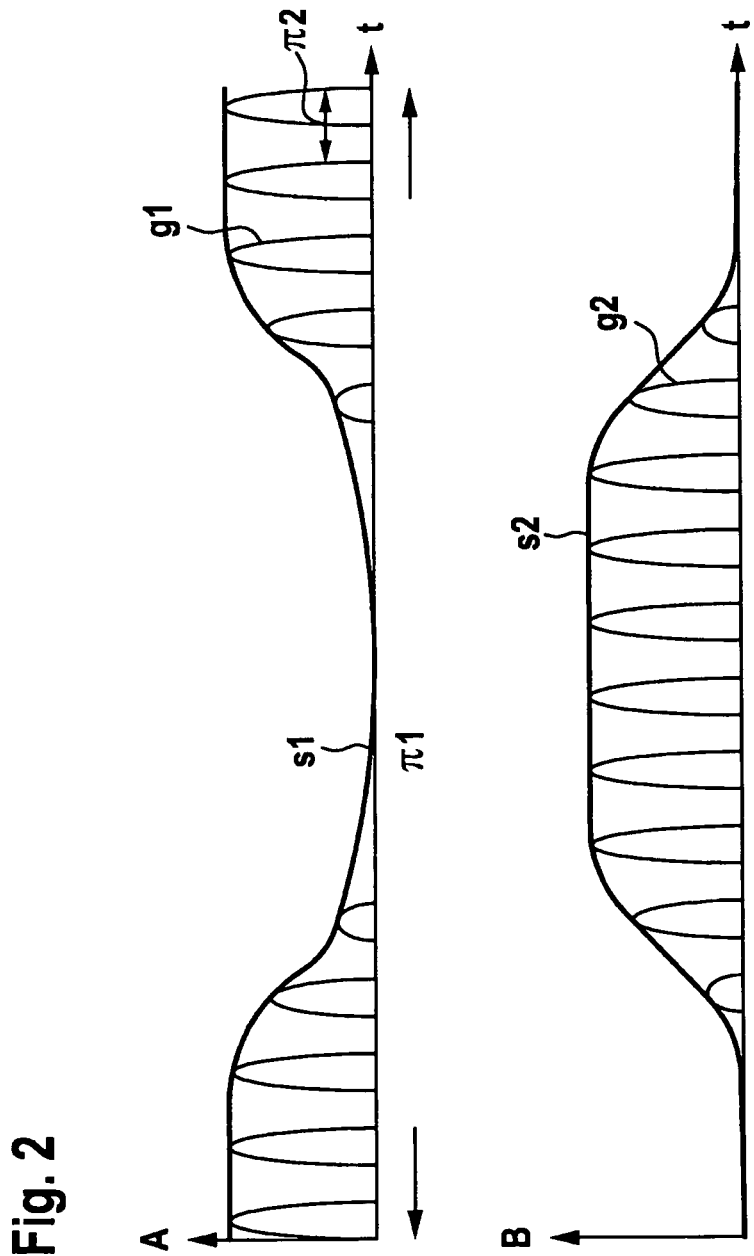
FIG. 2 shows two coordinate systems for representing two examples of voltage signals picked up on the micromechanical component of FIGS. 1A and B.

FIG. 2 shows two coordinate systems for representing two examples of voltage signals A and B picked up on the micromechanical component of FIGS. 1A and 1B. The abscissas of the two coordinate systems include time axis t, where the time range represented corresponds to a period n1 of a deflection of the mirror element about the first axis of rotation. The ordinates of the two coordinate systems indicate picked up voltage signals A and B.

In the operating mode represented here, the mirror element is adjusted about the two axes of rotation in such a way that the ratio between period n1 and a period n2 of a deflection of the mirror element about the second axis of rotation is equal to 16:1. The maxima of two graphs g1 and g2 plotted in the two coordinate systems correspond to a maximum adjustment of the mirror element about the second axis of rotation. However, envelopes s1 and s2 of two graphs g1 and g2 indicate an adjustment of the mirror element about the first axis of rotation.

In an advantageous refinement of an evaluation unit of the micromechanical component described here, a difference between two voltage signals A and B is evaluated for ascertaining the instantaneous reflection position of the reflected beam on the chip. Since the difference between two voltage signals A and B is not sensitive to external influences, such as daylight, brightness of the at least one light source and/or a temperature, the measurement accuracy may thus be improved easily and/or the risk of false measurement results may be reduced.

The specific embodiment of the micromechanical component described on the basis of FIGS. 1A and 1B may be used in a projector. The projected image there is formed by scanning deflected light beam 30 over an area where the light intensity of incident light beam 28 is varied at the same time. Before projecting an image, a calibration (synchronization) of the drive may be performed in order to adjust mirror element 10 and a device (not shown) for light beam modulation after the micromechanical component is turned on. For example, the projected area may be completely illuminated for a brief period of time at reduced or slowly increasing beam brightness, while at the same time reflection position R1 through R6 is ascertained and evaluated. After a successfully performed synchronization, the desired image may then be projected. This initialization procedure after activation may at the same time be performed as a self-test of the micromechanical component and of the light source used.

The at least one optical sensor 34 may also be utilized to ascertain a brightness distribution on the surface onto which deflected light beam 30 is to be directed for a projected image in the case when the light source is temporarily turned off and mirror element 10 is moving. The brightness distribution on this area is thus also measurable and may be used for correcting/regulating the emission of the light source.

The micromechanical component described here may additionally also be used for a brightness calibration of various light sources, for example, light sources having different emitted wavelengths. For example, the individual light sources are activated in succession during the initialization for this purpose, so that their respective intensity is measured and corrected as needed.

Furthermore, using the micromechanical component described here, a function test of the micromechanical component and/or the light source is also possible during operation. The at least one optical sensor 34 is for this reason situated in such a way that it does not interfere with the function sequence executed to project the desired image.

It should preferably also be possible with a comparatively large number of "black pixels" of the projected image to detect the instantaneous position of mirror element 10 with respect to light window 12. This is implementable by mounting an aperture 42, in particular having a high reflectivity, on light window 12. If deflected light beam 30 strikes aperture 42, it is reflected almost completely as reflected beam 32 on chip 24. The instantaneous position of mirror element 10 with respect to light window 12 may be ascertained with the aid of reflected beam 32, which is deflected by aperture 42 without creating a perceptible light point in the projected image.

In addition, it is desirable to ascertain the instantaneous position of mirror element 10 in an extreme deflection of mirror element 10 in particular. If one would like to omit an aperture 42 on light window 12, there is the possibility of placing a bright frame around the projected image. The bright frame additionally projected around the projected image offers the possibilities in particular of precisely detecting the instantaneous position of mirror element 10 in an extreme deflection of mirror element 10 shortly before a change in the direction of rotation (reversal point). This enables an improvement in the cooperation of the components of the drive used to adjust mirror element 10. In addition, a synchronization of the adjusting movement of mirror element 10 and the light beam modulation is possible in this way.

With a projector, a high light intensity of incident light beam 28 is advantageous for a good contrast and a good perceptibility of the projected image. However, use of a powerful light source such as a laser is associated with a great risk of injury in the event deflected light beam 30 strikes a person's eye. The risk of injury with such an accident, however, is reduced significantly by ensuring through technical means that the light source will be deactivated immediately when a standstill of mirror element 10 is detected. By using the method described in the preceding paragraphs, it is possible to constantly monitor the operating status of mirror element 10 and, when a standstill of mirror element 10 is detected, to output a signal to shut down the light source. As an alternative to deactivating the light source, deflected light beam 30 may also be directed automatically onto aperture 42 if a movement of mirror element 10 is not detected, despite the fact that the light source is turned on. It is possible in this way to prevent deflected light beam 30 from striking an observer's eye.

What is claimed is:

1. A micromechanical component, comprising:
   a light window;
   a mirror element configured to be adjustable with respect to the light window from a first position about at least one axis of rotation into at least one second position;
   an optical sensor having a detection surface and configured to (i) ascertain at least one of a light intensity and an incident position of an incident light beam on the detection surface and (ii) supply a sensor signal corresponding to the at least one of the light intensity and the incident position of the incident light beam, wherein the light window, the mirror element in the first position and the detection surface are situated with respect to one another in such a way that a light beam is deflected onto the light window by the mirror element, and a portion of the light beam deflected onto the light window is reflected by the light window and at least partially strikes the detection surface;
   an evaluation device configured to define information about at least one of an instantaneous position of the mirror element with respect to the light window and an instantaneous intensity of the deflected light beam, taking into account the sensor signal supplied by the optical sensor; and
   a control unit configured to (i) adjust the mirror element about two axes of rotation for scanning a projection area with the aid of a portion of the light beam deflected onto the light window and transmitted through the light window, and (ii) upon receiving a supplied light beam blocking signal, adjust the mirror element in such a way that the deflected light beam is directed onto an aperture of the micromechanical component;
   wherein the aperture is mounted on the light window.

2. The micromechanical component as recited in claim 1, wherein the evaluation unit is configured to (i) recognize a standstill of the mirror element on the basis of a curve of the sensor signal over time, and (ii) if a standstill of the mirror element is recognized for a predefined period of time, output the light beam blocking signal to the control unit.

3. The micromechanical component as recited in claim 1, wherein the evaluation unit is configured to (i) recognize a standstill of the mirror element on the basis of the curve of the sensor signal over time, and (ii) if a standstill of the mirror element is recognized for the predefined period of time, output a shutdown signal to a light source emitting the deflected light beam.

4. A method for operating a micromechanical component having a light window and a mirror element configured to be adjustable with respect to the light window of the micromechanical component from a first position about at least one axis of rotation into at least one second position, comprising:
   ascertaining at least one of a light intensity and an incident position of an incident light beam on a detection surface positioned in an interior of the micromechanical component and situated with respect to the light window and the mirror element in the first position, wherein the light window, the mirror element in the first position and the detection surface are situated with respect to one another in such a way that a light beam is deflected onto the light window by the mirror element, and a portion of the light beam deflected onto the light window is reflected by the light window and at least partially strikes the detection surface;
   defining information about at least one of an instantaneous position of the mirror element with respect to the light window and an instantaneous intensity of the deflected light beam, taking into account the at least one of the ascertained light intensity and the ascertained incident position of the incident light beam; and
   wherein a curve over time of the ascertained light intensity on the detection surface is analyzed to detect a standstill of the mirror element, and if a standstill of the mirror element for a predefined period of time is recognized, a shutdown signal is output to a light source emitting the deflected light beam.

5. A method for operating a micromechanical component having a light window and a mirror element configured to be adjustable with respect to the light window of the micromechanical component from a first position about at least one axis of rotation into at least one second position, comprising:

ascertaining at least one of a light intensity and an incident position of an incident light beam on a detection surface positioned in an interior of the micromechanical component and situated with respect to the light window and the mirror element in the first position, wherein the light window, the mirror element in the first position and the detection surface are situated with respect to one another in such a way that a light beam is deflected onto the light window by the mirror element, and a portion of the light beam deflected onto the light window is reflected by the light window and at least partially strikes the detection surface;

defining information about at least one of an instantaneous position of the mirror element with respect to the light window and an instantaneous intensity of the deflected light beam, taking into account the at least one of the ascertained light intensity and the ascertained incident position of the incident light beam; and wherein a predefined image is projected onto a projection surface by adjusting the mirror element about two axes of rotation, in such a way that the projection surface is at least partially scanned with the aid of a portion of the deflected light beam transmitted through the light window, and at least once during the scanning of the projection surface, the instantaneous position of the mirror element is ascertained and compared with a predefined setpoint position of the mirror element.

6. The method as recited in claim 5, wherein before projection of the predefined image, the projection surface is at least partially scanned via an adjustment of the mirror element about at least one of the two axes of rotation, ensuring during the at least partial scanning of the projection surface that a light beam emitted by at least one emitting light source is not striking the detection surface, so that at least one partial light intensity on the projection surface is defined by ascertaining the light intensity on the detection surface.

7. A method for operating a micromechanical component having a light window and a mirror element configured to be adjustable with respect to the light window of the micromechanical component from a first position about at least one axis of rotation into at least one second position, comprising:
ascertaining at least one of a light intensity and an incident position of an incident light beam on a detection surface positioned in an interior of the micromechanical component and situated with respect to the light window and the mirror element in the first position, wherein the light window, the mirror element in the first position and the detection surface are situated with respect to one another in such a way that a light beam is deflected onto the light window by the mirror element, and a portion of the light beam deflected onto the light window is reflected by the light window and at least partially strikes the detection surface;

defining information about at least one of an instantaneous position of the mirror element with respect to the light window and an instantaneous intensity of the deflected light beam, taking into account the at least one of the ascertained light intensity and the ascertained incident position of the incident light beam; and wherein a predefined image is projected onto a projection surface by adjusting the mirror element about two axes of rotation, in such a way that the projection surface is at least partially scanned with the aid of a portion of the deflected light beam transmitted through the light window, and the mirror element is adjusted for a non-illuminated partial area of the projection surface in such a way that the deflected light beam is directed onto an aperture of the micromechanical component, wherein the aperture is mounted on the light window.

8. A method for operating a micromechanical component having a light window and a mirror element configured to be adjustable with respect to the light window of the micromechanical component from a first position about at least one axis of rotation into at least one second position, comprising:
ascertaining at least one of a light intensity and an incident position of an incident light beam on a detection surface positioned in an interior of the micromechanical component and situated with respect to the light window and the mirror element in the first position, wherein the light window, the mirror element in the first position and the detection surface are situated with respect to one another in such a way that a light beam is deflected onto the light window by the mirror element, and a portion of the light beam deflected onto the light window is reflected by the light window and at least partially strikes the detection surface;

defining information about at least one of an instantaneous position of the mirror element with respect to the light window and an instantaneous intensity of the deflected light beam, taking into account the at least one of the ascertained light intensity and the ascertained incident position of the incident light beam; and wherein at least two light sources are activated sequentially, and after activating one of the at least two light sources, the instantaneous intensity of the deflected light beam is ascertained, and taking into account the ascertained instantaneous intensity, a brightness control signal is output to the light source activated last.

* * * * *